United States Patent
Zarebski

(10) Patent No.: US 9,073,136 B2
(45) Date of Patent: Jul. 7, 2015

(54) METHOD FOR GENERATING OF NON-STRAIGHT GEAR TEETH

(75) Inventor: Igor Zarebski, Milejowice (PL)

(73) Assignee: Klingelnberg AG, Zurich (CH)

( * ) Notice: Subject to any disclaimer, the term of this patent is extended or adjusted under 35 U.S.C. 154(b) by 52 days.

(21) Appl. No.: 13/700,616

(22) PCT Filed: Mar. 8, 2011

(86) PCT No.: PCT/EP2011/053406
§ 371 (c)(1),
(2), (4) Date: Feb. 1, 2013

(87) PCT Pub. No.: WO2011/147600
PCT Pub. Date: Dec. 1, 2011

(65) Prior Publication Data
US 2013/0122787 A1   May 16, 2013

(30) Foreign Application Priority Data

May 28, 2010   (PL) ......................................... 391179

(51) Int. Cl.
*B23F 15/06* (2006.01)
*B23F 9/02* (2006.01)
*B23F 9/00* (2006.01)
*B23F 9/08* (2006.01)

(52) U.S. Cl.
CPC . *B23F 15/06* (2013.01); *B23F 9/00* (2013.01); *B23F 9/02* (2013.01); *B23F 9/08* (2013.01)

(58) Field of Classification Search
CPC ............... B23F 15/06; B23F 5/02; B23F 1/02
USPC .................. 451/47, 253, 5, 8, 9, 10
See application file for complete search history.

(56) References Cited

U.S. PATENT DOCUMENTS 5,941,124 A   8/1999 Tan
7,364,391 B1   4/2008 Stadtfeld et al.

FOREIGN PATENT DOCUMENTS

BE   344 361 A   9/1927
EP   0330 289 A1   8/1989
(Continued)

OTHER PUBLICATIONS

Ocheduszko, K., Kołaz ębate, Tom 1. Konstrukcja, 1985, WNT, Warszawa, Poland.
Ocheduszko, K., Kołaz ębate, Tom 2. Wykonanie i montaż, 1976, WNT, Warszawa, Poland.
Stadtfeld, Dr. Hermann J., "The Basics of Spiral Bevel Gears", Gear Technology, Jan. 1, 2001, pp. 31-38, vol. 18, No. 1, Randall Publishing Co., Elk Grove, IL, US.
(Continued)

*Primary Examiner* — Robert Rose
(74) *Attorney, Agent, or Firm* — McCarter & English, LLP

(57) ABSTRACT

A gear teeth generation method carried out on multi-axis machines, using a disk tool. The tool travels along the gear tooth where its motion along a gap adjacent to the gear tooth is synchronized with the roll motion performed by said multi-axis machine so that the pressure line is on the machining surface of the tool. The tool machines a bottom land surface of the tooth with its perimeter. Machining of the tooth flank starts with the tool positioned such that the pressure line is near a first edge of the tooth flank. Positions of the tool and the tooth are changed to cause the pressure line to move away from the first edge of the tooth flank. Machining is finished when the pressure line reaches the opposite edge of the tool flank. The pressure line is on the machining surface of the tool throughout every stage of machining.

7 Claims, 7 Drawing Sheets

(56) References Cited

FOREIGN PATENT DOCUMENTS

| | | |
|---|---|---|
| GB | 1 499 988 A | 2/1978 |
| WO | WO-2011/017301 A1 | 2/2011 |

OTHER PUBLICATIONS

International Search Report for International Application No. PCT/EP2011/053406, mailed Jul. 7, 2011.

International Preliminary Report on Patentability for International Application No. PCT/EP2011/053406, issued Dec. 4, 2012.

| Method | Roll | Lengthwise motion | Working stroke |
|---|---|---|---|
| 1. Maag small gears | R- fast<br>Q- fast | L- slow | Z1 |
| 2. Maag big gears | R- slow<br>Q- slow | L- fast | Z2 |
| 3. Coniflex® | R- slow<br>Q- slow | L- 0 (no feed) | Z3 |
| 4. New method | R- slow<br>Q- slow | L- slow | Z4 |

METHOD FOR GENERATING OF NON-STRAIGHT GEAR TEETH

CROSS-REFERENCE TO RELATED APPLICATIONS

This application is the U.S. National Phase of International Application No. PCT/EP2011/053406, filed Mar. 7, 2011, which, in turn, claims priority to Polish Application No. P-391179, filed May 28, 2010, the contents of which are hereby incorporated by reference in their entirety as part of the present disclosure.

FIELD OF THE INVENTION

The present invention is a method for generating of non-straight gear teeth on multi-axis machines with disk cutters, which might be used for parts like e.g. bevel gears or face gears with non-straight teeth. The term non-straight teeth refers to such teeth wherein the tooth lines are not placed along the creator lines of the pitch surface of the gear, according to the classification in the book Ochęduszko K.: Kołazębate, Tom 1. Konstrukcja. WNT, Warszawa, 1985. This book concerns the designing of gears.

BACKGROUND OF THE INVENTION

It is known from U.S. Pat. No. 7,364,391 to produce bevel gears by providing a multi-axis free form gear cutting machine and a single disk cutter. The single disk cutter is positioned relative to the workpiece so that it cuts the first part of the gap. The tool and the workpiece are then re-positioned so that the remaining part of the gap is cut. Initially, a first transformation is made from the machine axes settings of the first cutter of the conventional machine to the co-ordinates of the theoretical cradle type basic machine. These basic settings are then transformed to the multi-axis machine settings and the first part of a gap is cut. Next a series of transformations is made similarly in order to cut the remaining portion of the gap. This method could be used also for grinding, because it converts machining with two interlocking tools to machining with a single tool.

It is known from Ochęduszko K.: Kołazębate, Tom 2. Wykonanie i montaż. WNT, Warszawa, 1976, which is a book on gear technology, to manufacture gear teeth by using profile and generating methods. In case of profile methods the tooth profile results from the tool profile. In case of generating methods the tooth profile is generated, being created as an envelope of consecutive positions of the tool profile. Here, besides the cutting motion of the tool, a roll motion is carried out (the generating motion). The generating motion consists of a rotary motion of the workpiece and a transverse motion.

It is known in the industry (source: Ochęduszko K.: Kołazębate, Tom 2. Wykonanie i montaż. WNT, Warszawa, 1976) to machine gear teeth by using generating methods and disk tools. There are appropriate tools available, for green machining (e.g. disk milling cutters) as well as for finishing machining (e.g. disk grinding wheels). There are also machine tools available, which provide appropriate work motions made by the tool relative to the workpiece, resulting in machining of the workpiece. Among the generating methods that allow for cutting of correct bottom land shape, MAAG, NILES and KOLB methods are known.

Prior art methods for generating of gear teeth with disk tools did not utilize the synchronization between the lengthwise motion and the roll motion, which caused the total work travel of the machine, required for complete generating of the tooth flank, to be relatively long. In case of the American U.S. Pat. No. 7,364,391, discussed earlier, the lengthwise travel is zero and the tool is positioned in the middle of the teeth width, which causes the bottom land to reflect the shape of the tool and therefore it is concave curved, which is detrimental to gear's strength.

The inconvenience of the prior art methods for generating of the gear teeth with correct bottom land shape using disk tools is that at least one component motion of the work motion is oscillatory, and therefore it is carried out many times at each gap being machined, which is required in order to completely generate the flank surface, and so it takes consequently relatively big amount of time, reducing productivity of those methods.

SUMMARY OF THE INVENTION

The goal of the present invention is to utilize motions for generating of the non-straight gear teeth with disk tools, which motions do not have an oscillatory component motion, nevertheless, a complete generation of flank surfaces is secured, and therefore the amount of machining time required is reduced.

The substance of the method for generating of non-straight gear teeth on multi-axis machines using disk tools, as of the present invention, is that a disk tool is travelling along the gear tooth where its motion along the gap is synchronized with the roll motion so that the pressure line is on the machining surface of the disk tool, the disk tool is machining the bottom land surface of the tooth with its perimeter, wherein the machining of the flank of the tooth starts with the disk tool positioned with reference to the gear tooth so that the pressure line is near the edge of the tooth flank, and consecutively the mutual positions of the disk tool and the gear tooth are changed to cause the pressure line to move further away from the edge of the tooth flank, and the machining of the tooth flank is finished when the pressure line reaches the opposite edge of the gear flank. Furthermore, the positions of the tooth flank and the disk tool are so that at every stage of machining of the tooth flank the pressure line is on the machining surface of the disk tool. The disk tool may also not machine the bottom land surface with its perimeter. At every stage of machining of the tooth flank one pressure line is used. Selecting of consecutive pressure lines in machining of the tooth flank causes the consecutive selected pressure lines to be the creators of the surface of the tooth flank.

When compared to the prior art methods, the machining time in case of the present invention method is substantially reduced. The method is suitable only for non-straight gear teeth.

In the described method, one flank of the gap is completely machined in one work stroke. Should the next flank be machined, then the second work stroke is required. If for some reasons the diameter of the disk tool is too small to cover the entire pressure line, then in order to completely machine the flank of the gap additional work strokes are needed. However, due to the lack of the oscillatory component motion, the additional travel will be always shorter, and hence the machining time will be shorter when compared to the prior art methods.

The procedure as described above is then repeated for each gap, and the entire gear is therefore machined.

BRIEF DESCRIPTION OF THE DRAWINGS

One embodiment of the invention is described below by reference to the drawings, wherein.

DETAILED DESCRIPTION OF EMBODIMENTS OF THE INVENTION

Figure 1:
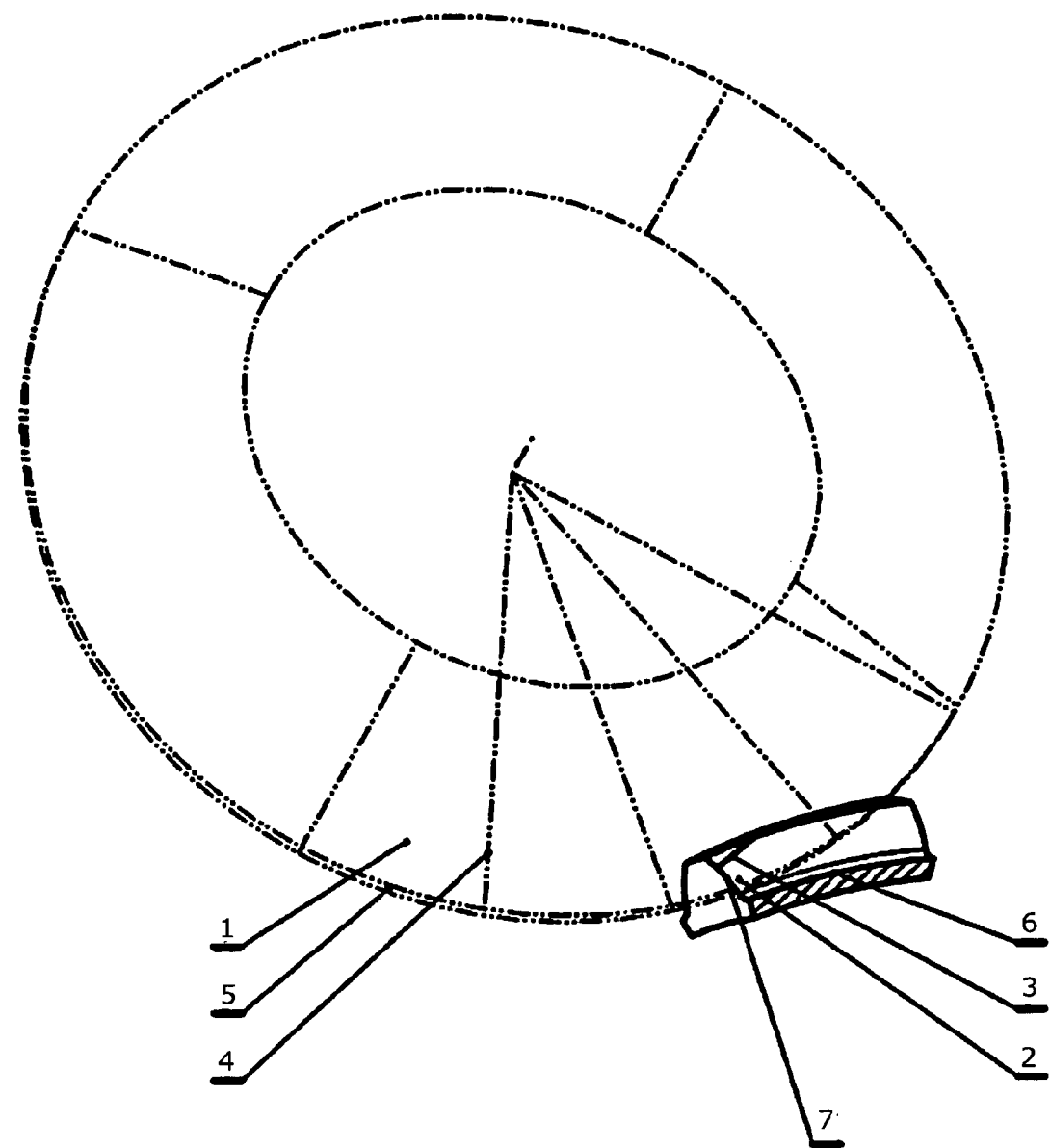
FIG. 1 shows a schematic representation of the initial stage of the machining of the tooth's flank, according to the invention, where a disk tool cutter is employed.
Figure 2:
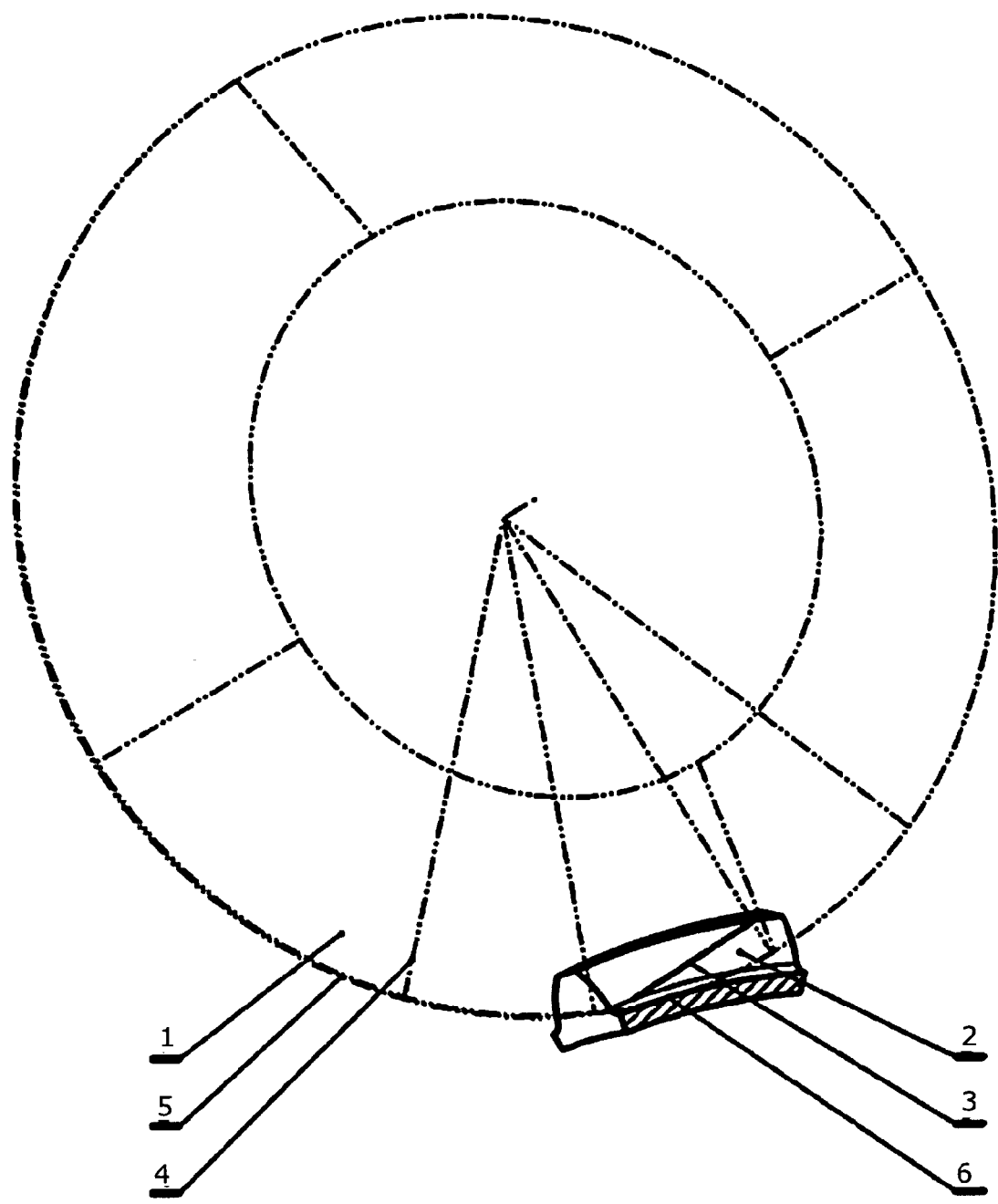
FIG. 2 shows a schematic representation of the middle stage of the machining of the tooth's flank, according to the invention.
Figure 3:
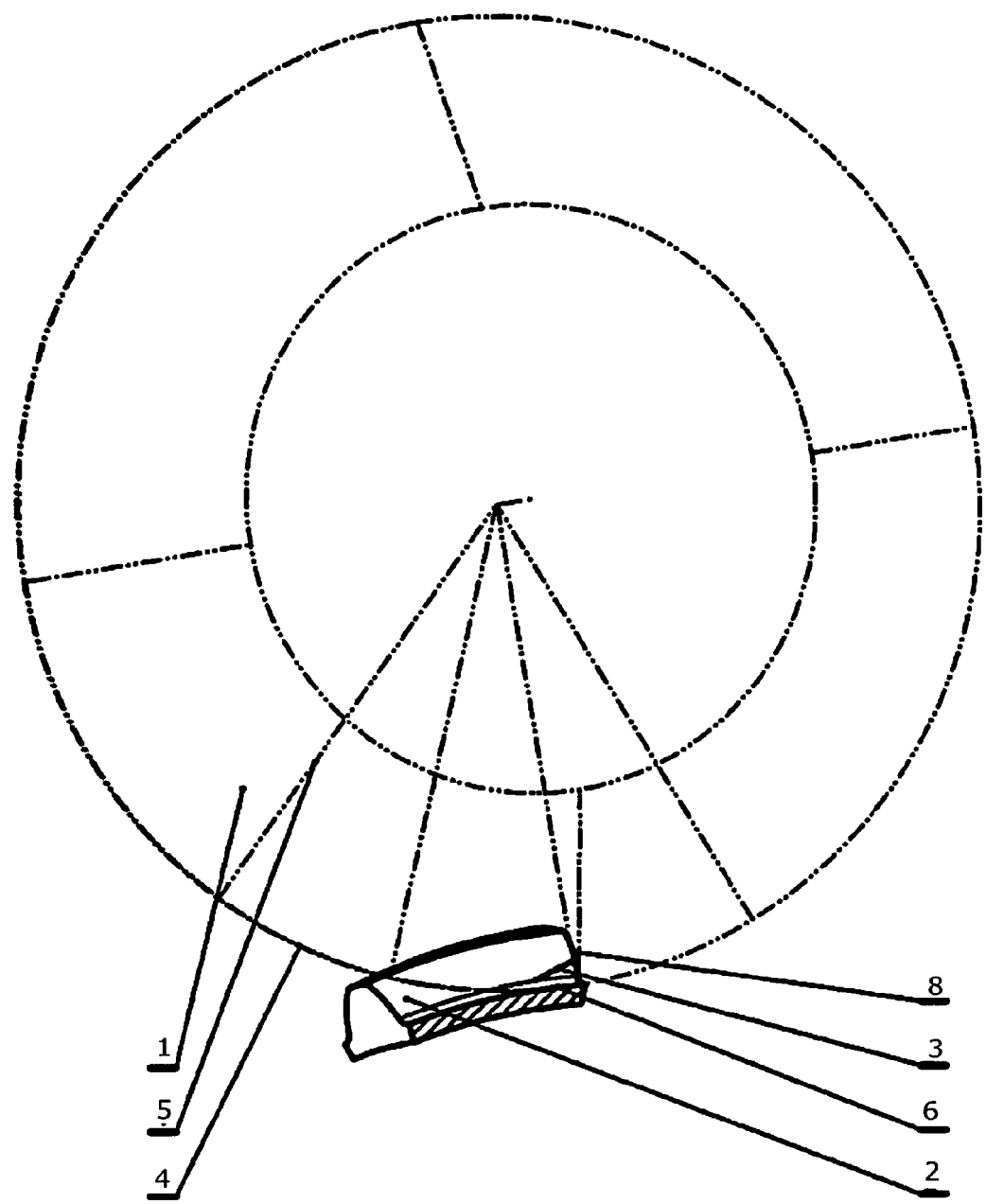
FIG. 3 shows a schematic representation of the completing stage of the machining of the tooth's flank, according to the invention.

The substance of the invention is presented schematically in the figures, and so in the FIG. 1 the initial stage of the machining of the tooth's flank is presented, in the FIG. 2 the middle stage of the machining of the tooth's flank is presented, and in the FIG. 3 the completing stage of the machining of the tooth's flank is presented.

All three FIGS. 1, 2 and 3 show one gear tooth 2 as cut-out of a gear. This gear is a bevel gear with non-straight teeth 2. The tooth lines of these non-straight teeth 2 are not placed along the creator lines of the pitch surface of the gear.

A disk tool cutter 1, here represented by two concentric circles, is travelling along the gear tooth 2 where its motion along the tooth gap (L movement in lengthwise direction, cf. FIG. 6) is synchronized with the roll motion (motions R and Q in FIG. 6) so that the pressure line 3 is on the machining surface 4 of the disk tool cutter 1. The disk tool cutter 1 is machining the bottom land surface 6 of the tooth 2 with its perimeter 5, wherein the machining of the flank of the tooth 2 starts with the disk tool cutter 1 positioned with reference to the gear tooth 2 so that the pressure line 3 is near the edge 7 of the tooth flank 2 (cf. FIG. 1), and consecutively the mutual positions of the disk tool cutter 1 and the gear tooth 2 are changed to cause the pressure line 3 to move further away from the edge 7 of the tooth flank 2, and the machining of the tooth flank 2 is finished when the pressure line 3 reaches the opposite edge 8 of the gear flank 2 (cf. FIG. 3). Furthermore, the positions of the tooth flank 2 and the disk tool cutter 1 are so that at every stage of machining of the tooth flank 2 the pressure line 3 is on the machining surface 4 of the disk tool 1. The disk tool 1 may also not machine the bottom land surface 6 with its perimeter 5. At every stage of machining of the tooth flank 2 one pressure line 3 is used. Selecting of consecutive pressure lines 3 in machining of the tooth flank 2 causes the consecutive selected pressure lines 3 to be the creators of the surface of the tooth flank 2.

Figure 4:
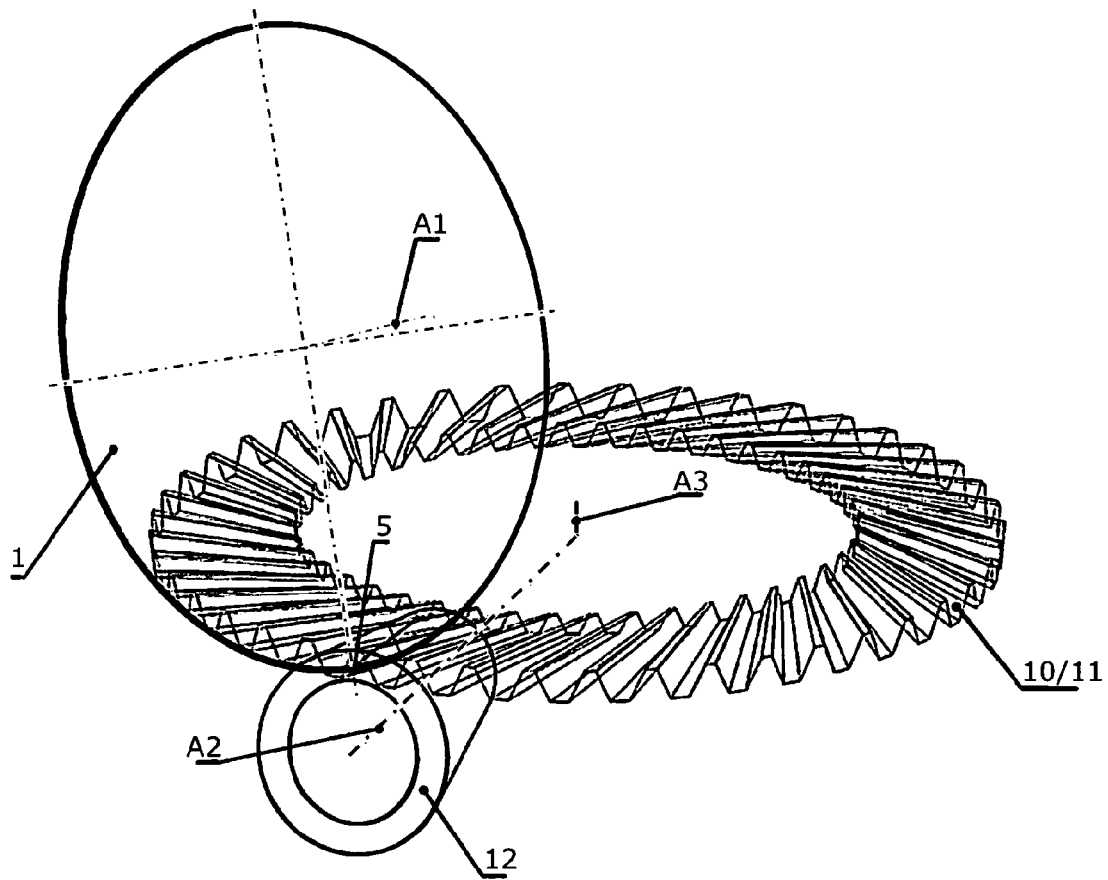
FIG. 4 shows details regarding the positioning of the disk tool cutter relative to the toothing of a gear, according to the invention.

FIG. 4 shows details regarding the positioning of the disk tool cutter 1 relative to the toothing of a crown gear 10, according to the invention. The disk tool cutter 1 is here represented by its perimeter 5. The disk tool cutter 1 has a tool axis A1. The crown gear 10 is represented by the corresponding virtual plane gear 11. The virtual plane gear 11 is razor-thin (the actual thickness of the plane gear 11 is zero). The bevel gear pair comprising a crown gear 10 and a pinion 12 is precisely defined by the corresponding virtual plane gear 11 if the pitch cone angles are known. The crown gear 10 and pinion 12 forming a bevel gear pair both have the same number of plane gear teeth. A2 is the pinion axis and A3 is the crown gear axis. The axis A2 and A3 of the crown gear 10 and pinion 12 intersect, as illustrated in FIG. 4.

The inventive gear teeth generation method is carried out as described in connection with FIGS. 1-3. A gear cutting machine is employed which provides for the required movements of the disk tool cutter 1 relative to a workpiece centered around the crown gear axis A3. At every stage of machining of the tooth flank 2 on the workpiece one pressure line 3 is used. The pressure line is the line of contact between the machining surface 4 of the disk tool cutter 1 and the tooth flank to be produced. Selecting of consecutive pressure lines 3 in machining of the tooth flank 2 causes the consecutive selected pressure lines 3 to be the creators of the surface of the tooth flank 2, as described above.

Figure 5A:
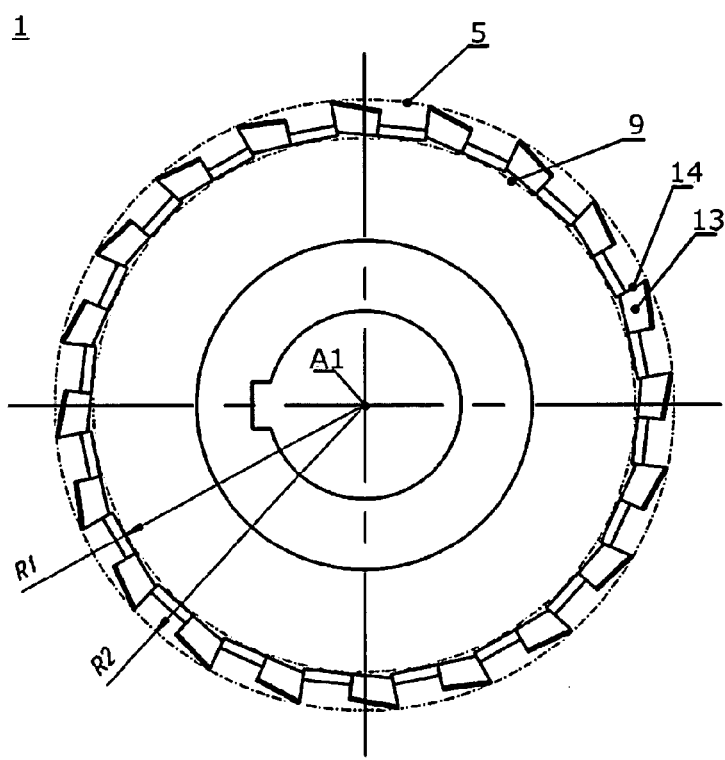
FIG. 5A shows a top view of a disk tool cutter, according to the invention.
Figure 5B:
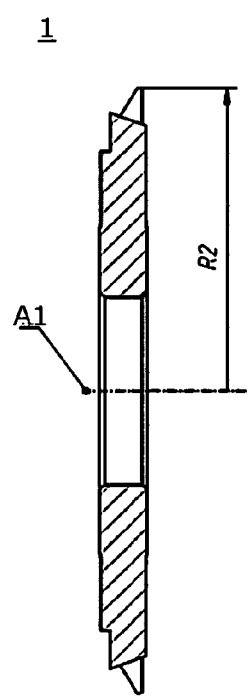
FIG. 5B shows a side view of the disk tool cutter of FIG. 5A.

FIG. 5A shows a top view of a preferred embodiment of a disk tool cutter 1, according to the invention. FIG. 5B shows a corresponding side view of the disk tool cutter 1 of FIG. 5A. The disk tool cutter 1 is mounted on a tool spindle (not shown) of a gear cutting machine. The tool axis A1 is caused by this machine to perform three-dimensional movements relative to the workpiece mentioned. The disk tool cutter 1 rotates around this tool axis A1 while being moved with its machining surface 4 along the tooth flanks to be produced.

As illustrated in FIGS. 5A and 5B, the disk tool cutter 1 might comprise cutting elements or blades 13 arranged along its perimeter 5. The machining surface 4 is here defined as the ring-shaped area between the outer perimeter 5 of the disk tool cutter 1 and the circle 9 (cf. FIG. 5A). The circle 9 has a radius R1 which is smaller than the radius R2 of the outer perimeter 5. The cutting elements or blades 13 each have a cutting edge 14. The disk tool cutter 1 in FIG. 5A is designed to be rotated counter clockwise.

Each cutting element or blade 13 has at least one cutting edge 14. The cutting elements or blades 13 might have more than one cutting edge 14.

Instead of a disk tool cutter 1 with cutting elements or blades 13 a grinding wheel or disk could be used in the same manner as described above.

Figure 6:
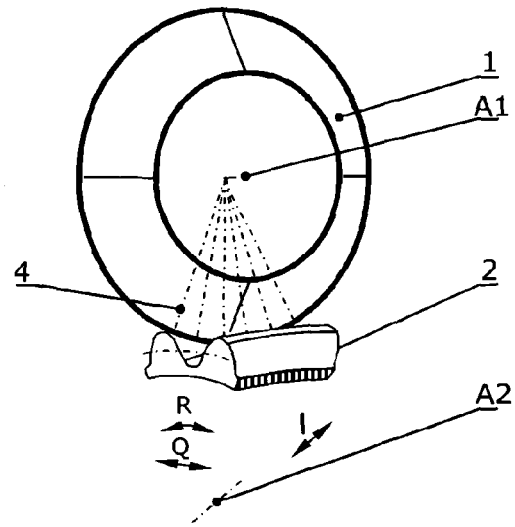
FIG. 6 shows a schematic representation of various known gear cutting methods versus the inventive gear cutting method.

FIG. 6 shows a schematic representation of various known gear cutting methods versus the inventive gear cutting method. Please note that the main cutting surface 4 exists in the rear of the disk tool cutter 1. The main cutting surface 4 is thus not visible in FIG. 6. FIG. 6 comprises a table and a graphical representation showing a disk tool cutter 1 and two teeth of a gear. The same reference numbers are used in FIG. 6 as in the previous figures. The definitions and descriptions of the other figures are also applicable to the situation shown in FIG. 6. The arrows R and Q together represent the joint roll motion between disk tool cutter 1 and gear 10 to be produced. The joint roll motion is performed by the gear cutting machine. The arrow L represents the lengthwise motion of the disk tool cutter 1 relative to the gear 10. The lengthwise motion L is parallel to the pinion axis A2, i.e. this movement is perpendicular to the crown gear axis A3 (cf. FIG. 4).

The table in FIG. 6 shows two different generating methods called MAAG methods. A distinction is made between the MAAG method as applied in case of small gear (gears with small diameters) and the MAAG method as applied in case of bigger gear (gears with larger diameters). A zigzag movement is carried out as a working stroke (see the column on the right hand side of the table). In case of small gears a first zigzag movement Z1 from right to left is performed whereas in case of big gears an up and down zigzag movement Z2 is carried out. During the generation of small gears the roll movements R and Q are quite fast as compared to the roll movements R and Q used for the generation for bigger gears. For small gears the lengthwise movement L is slow whereas for bigger gears this movement L is fast.

The Coniflex® generating method is also depicted in the table. The roll movements R and Q used for the Coniflex® generating method both are slow. L=0, which means that no feed movement is carried out in the lengthwise direction. The resulting working stroke Z3 is a linear movement.

The inventive method is represented by the row at the bottom of the table of FIG. 6. The roll movements R and Q used for the inventive method both are slow. The lengthwise movement L is slow, too. The resulting working stroke Z4 is a linear or slightly curved movement resulting from CNC-coordinated and coupled Q and L movements. As described above, the disk tool cutter 1 is travelling along the gear tooth 2 where its motion along the tooth gap (L movement in lengthwise direction) is synchronized with the roll motion (motions R and Q) so that the pressure line 3 (cf. FIGS. 1-3) is on the machining surface 4 of the disk tool cutter 1. The mutual (relative) positions of the disk tool cutter 1 and the gear tooth 2 are changed consecutively to cause the pressure line 3 to move further away from the edge 7 of the tooth flank 2 (cf. FIG. 1), and the machining of the tooth flank 2 is finished when the pressure line 3 reaches the opposite edge 8 of the gear flank 2 (cf. FIG. 3).

The disk tool 1, preferable a disk tool cutter 1 as shown in FIGS. 5A and 5B, can be used in connection with all embodiments of the invention.

Figure 7:
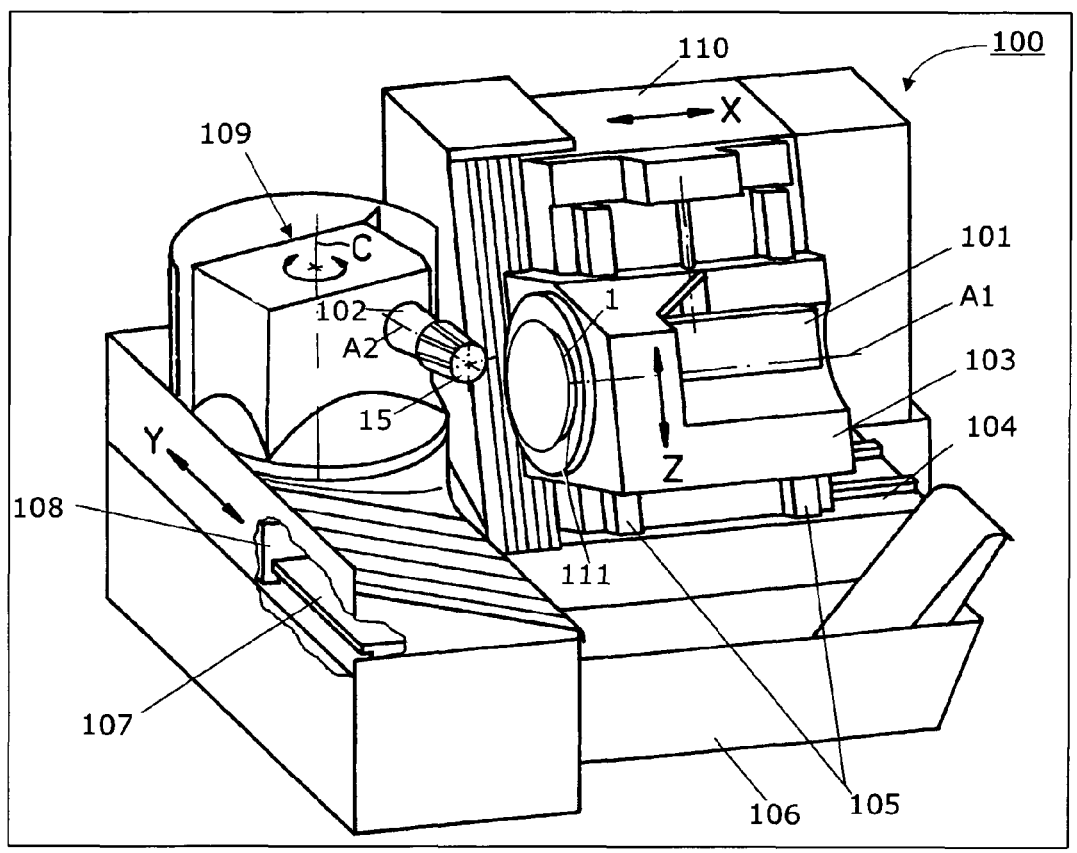
FIG. 7 shows a perspective representation of a Klingelnberg bevel gear cutting machine, which could be used in connection with the present invention.

FIG. 7 shows a perspective representation of a Klingelnberg bevel gear cutting machine 100 (e.g. a gear cutting machine 100 belonging to the C-family of Klingelnberg machines), which can be used in connection with the present invention. The gear cutting machine 100 is a CNC-controlled machine having six axes. At least five of these six axes can be caused by the CNC control of the machine 100 to perform coordinated and coupled simultaneous movements, as required when carrying out the inventive method.

The CNC-machine 100 can be used for cutting bevel gears 10, 12 with non-straight teeth, according to the invention. The CNC-machine 100 could have the following set-up/arrangement. A machine element 110 is arranged and guided so that it is able to perform a linear movement parallel to the straight axis X (1. axis). The machine element 110 is guided and mounted on a machine bed 104. A first sliding element 103 is mounted and guided by guides 105 so that it is able to carry out linear up and down movements parallel to the Z axis (2. axis). The guides 105 are positioned on a sloped side of the machine element 110. A spindle drive 101 is used to move the first sliding element 103 up and down.

A second sliding element 108 with a tool spindle is mounted on the machine bed 106. The second sliding element 108 is mounted and guided so that it can perform linear sliding movements parallel to a straight Y-axis (3. axis). The Y-axis is perpendicular to the X-axis. The second sliding element 108 is guided along guides 107. There is a pivoting element 109 carried by the second sliding element 108. The pivoting element 109 has a vertical pivot axis C (4. axis). The Z-axis is sloped with respect to the vertical pivot axis C.

The first sliding element 103 carries a tool spindle 111. The tool spindle causes a tool (e.g. the disk tool 1) to rotate around the tool axis A1 (5. axis). The workpiece 15 (here a pinion) is mounted on a workpiece spindle 102 carried by the second sliding element 108 and pivoting element 109. The workpiece spindle 102 together with the workpiece 15 is enabled to perform sliding movements parallel to the Y-axis and pivoting movements around the C-axis. The workpiece 15, mounted on the workpiece spindle 102, can perform a rotational movement around the axis A2 (6. axis). Please note that in FIG. 7 the disk tool 1 is shown as a simple disk for sake of simplicity.

The invention claimed is:

1. A method of generating non-straight gear teeth on bevel gears or face gears utilizing a multi-axis machine having a disk tool, comprising:
    executing a roll motion with the multi-axis machine;
    moving the disk tool along a gear tooth with a motion along a gap adjacent the gear tooth synchronized with the roll motion, such that the resulting working stroke is a linear or slightly curved movement, and such that a machining pressure line is located on a machining surface of the disk tool, thereby machining a flank of the tooth;
    wherein the machining pressure line is defined by a line of contact between the machining surface of the disk tool and a tooth flank of the gear tooth to be produced; and
    wherein said machining includes:
    positioning the disk tool relative to the gear tooth such that said pressure line is near a first edge of the flank of the gear tooth; and
    consecutively changing the relative positions of the disk tool and gear tooth such that said machining pressure line moves away from the first edge of the tooth flank until said pressure line reaches an opposite edge of the tooth flank, and said pressure line remains on the machining surface of the disk tool throughout said machining of said flank.

2. A method according to claim 1, wherein said machining does not include machining of a bottom land surface of the tooth with a perimeter of the disk tool.

3. A method according to claim 1, wherein said machining includes machining a bottom land surface of the tooth with a perimeter of the disk tool.

4. A method according to claim 1, wherein said pressure line is a single pressure line.

5. A method according to claim 1, further comprising using consecutive pressure lines during said machining to create the surface of the tooth flank.

6. A method according to claim 1, wherein the disk tool comprises a disk tool cutter having multiple cutting elements or blades arranged along a perimeter of the disk tool cutter, wherein each cutting element or blade includes at least one cutting edge.

7. A method according to claim 1, further comprising repeating the machining step on multiple gear teeth to create a bevel gear with non-straight teeth.

* * * * *